(12) United States Patent
Geist et al.

(10) Patent No.: US 6,591,223 B1
(45) Date of Patent: Jul. 8, 2003

(54) PROCESS FOR THE RECORDING OF PULSE SIGNALS

(75) Inventors: Albrecht Geist, Aalen (DE); Frank Klemm, Jena (DE); Manfred Loth, Jena (DE)

(73) Assignee: Carl Zeiss-Stiftung, Heidenheim (DE)

( * ) Notice: Subject to any disclaimer, the term of this patent is extended or adjusted under 35 U.S.C. 154(b) by 164 days.

(21) Appl. No.: 09/694,874

(22) Filed: Oct. 23, 2000

(30) Foreign Application Priority Data

Oct. 22, 1999 (DE) .......................... 199 51 188

(51) Int. Cl.[7] .......................... G06F 15/00; G06F 19/00
(52) U.S. Cl. .......................... 702/176; 702/79
(58) Field of Search .................. 702/127, 176, 702/180, 187, 110, 79–80; 356/316, 317, 318

(56) References Cited

U.S. PATENT DOCUMENTS 5,027,064 A * 6/1991 Cripps .......................... 324/767
5,754,449 A * 5/1998 Hoshal et al. .................. 702/176
5,909,278 A * 6/1999 Deka et al. .................... 356/318

* cited by examiner

Primary Examiner—Bryan Bui

(57) ABSTRACT

A process for recording pulse signals of at least two input channels includes sampling the input channels with a pre-determined sampling frequency for events which have occurred, and after detection of an event in at least one of the input channels, or after overflow of a counter, storing the present state of all the input channels in a memory register together with a magnitude characterizing a time interval to the last storage operation. The device for recording pulse signals of at least two input channels according to the process includes a clock oscillator, a sampler that samples the input channels, a counter, and a memory. The detection of a first event in one of the input channels or the overflow of the counter, according to which event occurs first, triggers and operation of storage of the states of all the input channels and of the last counter state at the occurrence of the event.

9 Claims, 2 Drawing Sheets

PROCESS FOR THE RECORDING OF PULSE SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

In microscopy, and particularly in fluorescence correlation spectroscopy (FCS), as for example is known from the ConfoCor of Carl Zeiss, the time series of signals produced by individual fluorescence events and detected by so-called Single Photon Counting are, for evaluation, either time-correlated with themselves (autocorrelation) or are time-correlated with the time series of signals of a second input channel (cross-correlation). The correlation evaluation takes place by means of special hardware correlators, such as are for example offered by the ALV-Laser Vertriebsgesellschaft company of Langen, Germany under the designation "5000 Multiple Tau Correlator". Such correlators operate according to the so-called multiple tau process, in which the input signals are respectively multiplied together over a correlation step time and the resulting products are added, the correlation step time being logarithmically extended stepwise. The advantage of this process is that the computation cost remains relatively small, even for long correlation times. It is however disadvantageous that a low-pass filtering takes place due to the combination of the input signals in the higher correlation steps. Moreover, the original data are lost, so that a processing and a subsequently following new or different evaluation is not possible. For the correlation evaluation of a single channel with individual pulse signals, and thus a signal sequence which gives binary data 0 and 1, where the 1 occurs only occasionally, it is known to sample the input channel at a fixed frequency and to record and store only the time intervals between the individual pulses. The correlation calculation then takes place simply, by the determination of all the pulse time intervals, which have appeared in the pulse sequence. An application of this process to the signals of several input channels is however not known.

SUMMARY OF THE INVENTION

The invention has as its object a process for the recording of pulse signals of several input channels, making possible as compact as possible a storage of the information without loss of information.

This object is attained by a process for the recording of pulse signals of at least two input channels, comprising:

sampling said input channels with a predetermined sampling frequency for events which have occurred, and after detection of an event in at least one of said input channels, or after overflow of a counter, storing the present state of all said input channels in a memory register together with a magnitude characterizing a time interval to the last storage operation. This object also is attained by a process for the recording of pulse signals of at least two input channels, comprising:

sampling said input channels with a predetermined sampling frequency of events which have occurred, and after detection of an event in at least one of the input channels, or after overflow of a counter, storing the states of all said input channels in the sampling cycle in which an event took place and for a predetermined number of sampling cycles after the occurrence of the first event, together with a magnitude characterizing the time interval to the last preceding storage operation.

In a first embodiment of the invention, the several input channels are sampled at a predetermined constant frequency for occurring events, and after the detection of an event in one of the input channels or after overflow of a counter—according to which of these two events occurs first—the present state of all the input channels is stored in a memory register together with a magnitude characterizing the time interval from the last storage operation.

In a second embodiment of the invention, the several input channels are likewise sampled at a predetermined constant frequency for occurring events. And in this second embodiment also, the storage takes place after the detection of an event in one of the input channels or after the overflow of a counter, according to which of the two events occurs first. However, in this embodiment, the states of the input channels in the sampling cycle in which the event occurred, and additionally, for a predetermined number of sampling cycles after the occurrence of the event, are stored, together with a magnitude characterizing the time interval to the last storage.

In both embodiments, the information concerning the signal sequences in all the input channels is completely retained in the stored data; by means of the time interval coding which was carried out, the raw data are present in a form which makes possible a later autocorrelation and/or cross-correlation evaluation of the histograms of the pulse time intervals of the input channels. The storage requirement is in both cases dependent, primarily on the frequency of the events occurring in the input channels, and only secondarily on the sampling frequency.

In the first embodiment, only a single bit is required in the respectively stored words for each input channel; the remaining bits of each word are available for the representation of the time interval to the last storage operation. With two input channels and storage as 16-bit words, 14 bits thus result for the representation of the time interval. This embodiment makes possible an optimally efficient use of the storage space with signal sequences which have only very few events in relation to the duration of a single sampling cycle, so that in most cases a storage operation takes place because of the overflow of a counter. However, the rate of data to be stored becomes extremely high for signal sequences with many events, in which an event occurs in each sampling cycle.

In the second embodiment, there is required in each stored word for each input channel a number of bits which corresponds to the number of the predetermined sampling cycles over which the channel states are also stored, and in addition a further bit for the state in the scanning cycle which triggers the storage operation. With two input channels, a storage operation over respectively three sampling cycles following the first occurring event or the counter overflow, and storage as 16-bit words, consequently requires 8 bits for the storage of the states of the input channels, so that only a further 8 bits are available for the storage of the time interval to the last preceding storage. With signal sequences which have only very rare events, and consequently in most cases the storage operation is triggered by the overflow of a counter, the storage is inefficient in comparison with the first embodiment, since only a smaller number of bits is available for the counter, and a counter overflow results correspondingly more frequently. This disadvantage is however not very troublesome, since with signal sequences with rarely occurring events, the total storage requirement is small and therefore not critical. On the other hand, in comparison with the first embodiment, the storage space required with signal sequences with frequently occurring events, and hence also the maximum required storage space, is clearly reduced. Thus there result in the above numerical example and with a sampling rate of 20 MHz in the second embodiment, a maximum storage rate (when an event occurs in each sampling cycle) of 10 Mbyte/s, and a minimum storage rate (when no event occurs and the storage operation is consequently triggered by the counter overflow) of 155 kbyte/s. In contrast to this, the maximum data rate in the first embodiment and at the same sampling frequency is 20 Mbyte/s.

The data recorded according to the invention can be subsequently read out and/or processed. Furthermore the recorded data can also be subjected to a correlation evaluation, in which either the data of each individual channel are correlated with themselves (autocorrelation), or the data of two input channels are correlated together (cross-correlation). The stored data are therefore already in a form suitable for a linear correlation algorithm in which the correlation function is calculated without loss, that is, without any loss of information, from the histogram of the pulse intervals in time.

The combined application of two different correlation algorithms is however particularly advantageous, one of them, the linear algorithm, being applied for short correlation times and the second, the multiple tau process, being applied for longer correlation times. The boundary between the two algorithms, that is, the correlation time, which represents the boundary between the two algorithms, is then selectable by the user, by software implementation. The linear algorithm operates without loss and requires smaller computing capacity for short correlation times than does the multiple tau process; the required computing capacity then increases linearly with the correlation time. The computing capacity required for the multiple tau process is limited in comparison with this and is nearly independent of the correlation time. The boundary between the two processes is therefore appropriately set at such correlation times at which the required computing capacities for the two algorithms mutually correspond.

The process according to the invention is in particular best suited to data recording in fluorescence correlation spectroscopy, in which fluorescence signals from microscopically small volumes are recorded and are evaluated by correlation calculations. Correspondingly, the invention also preferably finds application in connection with confocal microscopes.

BRIEF DESCRIPTION OF THE DRAWINGS

Details of the invention are explained in detail hereinafter, with reference to the accompanying drawings, in which.

DETAILED DESCRIPTION OF PREFERRED EMBODIMENTS

Figure 1:
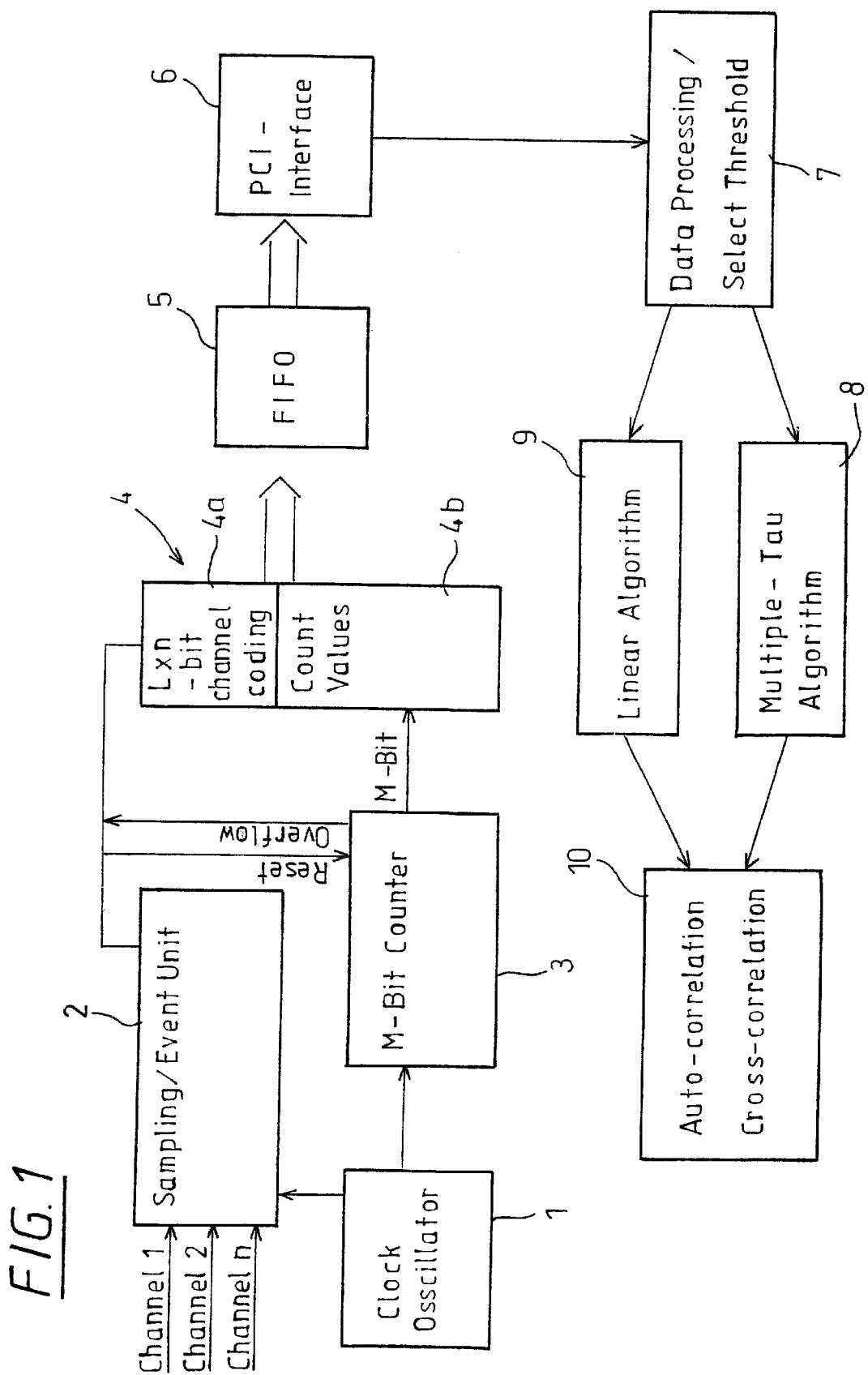
FIG. 1 shows a block circuit diagram for a data recording device for the process according to the invention.
Figure 2:
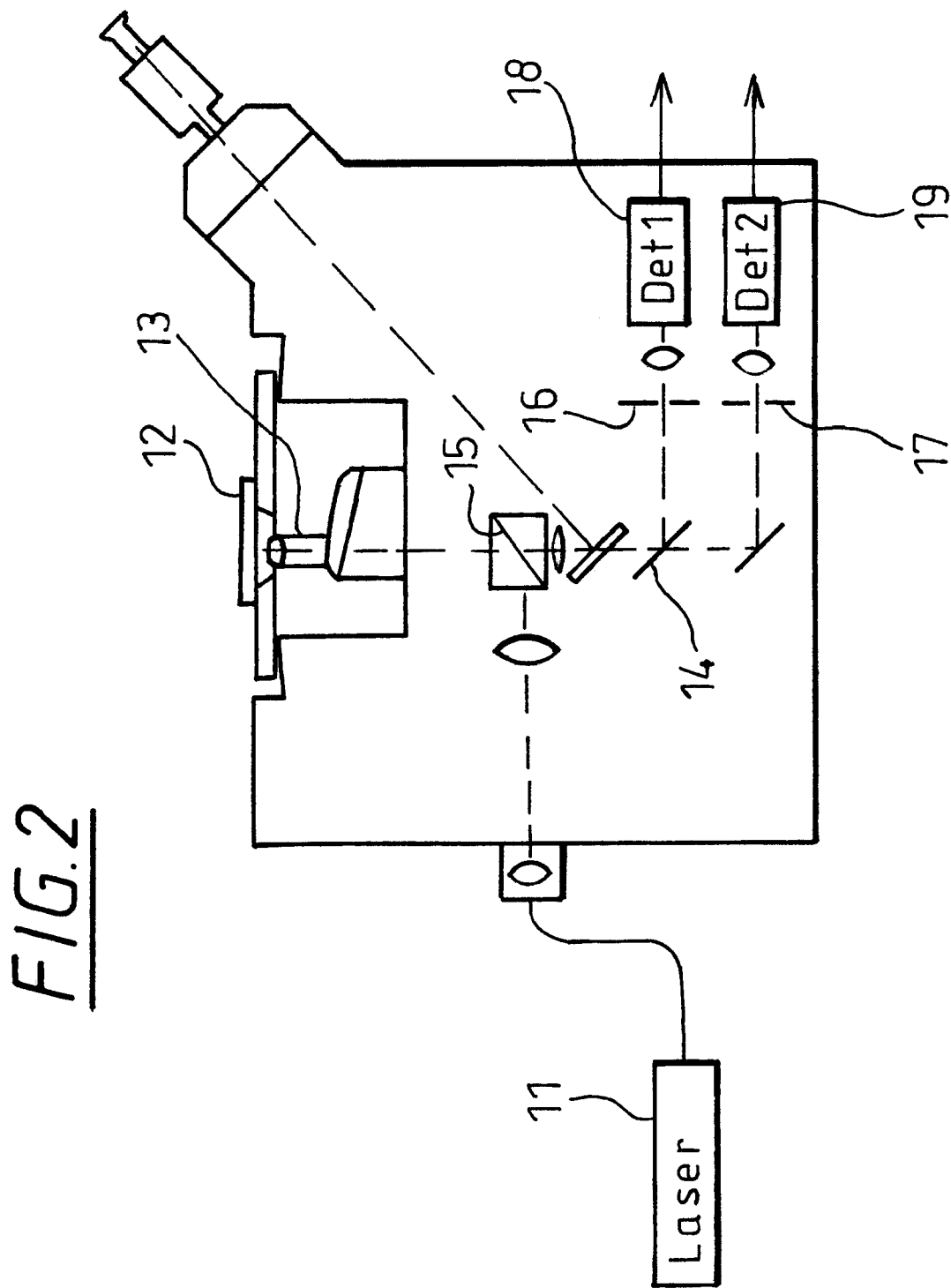
FIG. 2 shows a sketch of principle of a confocal microscope with two-channel fluorescence detection.

In FIG. 1, the several input channels are denoted by channel 1, channel 2, . . . channel n. The incoming signals are binary pulse signals which respectively consist of a series of "0" and "1", a "1" representing an event which has occurred. Insofar as the input signals are analog, they are to be converted into binary signals before the data recording.

A clock oscillator (1) provides the sampling frequency for the data recording in a sampling/event unit (2). The sampling frequency is chosen so that, in each of the input channels, at most a single event is to be expected in one sampling cycle, that is, within the period of one cycle of the oscillator (1). The number of the cycles provided by the clock oscillator is counted by a counter (3) having a data width of M bits. When the sampling of the input signals in the unit (2) detects an event (a binary "1") in one of the n channels before an overflow of the counter (3) takes place, the storing of the channel states and of the count of the counter (3) in a memory (4) is triggered. The counter is simultaneously reset to zero. If on the other hand no event is detected in one of the input channels up to reaching overflow of the counter (3), the states of the input channels and the state of the counter are likewise stored and the counter (3) is reset to zero. The storing of a data set is thus respectively triggered when either an event occurs in one of the input channels or a counter overflow takes place, according to which of these events appears first.

The memory (4), or each word stored in the memory (4), consists of two partial regions (4a) and (4b). The count of the counter (3), and thus a measure of the time elapsed since the last storage operation, is stored in a partial region (4b) of M bits. The states of the input channels are stored in the other partial region (4a), in binary. Both partial regions in common give, respectively in the hexadecimal system, a stored word which contains the information about the states of all input channels and the time elapsed since the last storage operation. Consequently the complete information concerning the signal sequences in time of all the input channels is contained in the sequence of stored words, with the time resolution given by the clock frequency.

In the first embodiment example, L=1, that is, 1 bit is required for the characterization of each input channel. The remaining bits are accordingly available for the characterization of the time interval since the last storage operation, and thus for the count of the counter (3) when the storage operation is triggered.

In the second embodiment example, L is odd and greater than unity. In this case, L bits are required for the characterization of the state of each input channel. Correspondingly, with each storage operation, the states of each of the input channels over L sampling cycles is recorded and stored. With L=4, for example, the states of the input channels in the sampling cycle bt1 in which the first detected event occurs, and in the three immediately following sampling cycles bt2, bt3 and bt4, are stored. For each input channel, the L bits then indicate whether and in which sampling cycle an event has taken place. The allocation in a 16-bit word with two input channels can for example appear as follows:

| | |
|---|---|
| Bits 1–7: | Sampling cycles which have elapsed since the last storage operation |
| Bit 8: | =1 when event has occurred in channel 1 in cycle bt1, otherwise = 0 |
| Bit 9: | =1 when event has occurred in channel 2 in cycle bt1, otherwise = 0 |
| Bit 10: | =1 when event has occurred in channel 1 in cycle bt2, otherwise = 0 |

-continued

| | |
|---|---|
| Bit 11: | =1 when event has occurred in channel 2 in cycle bt2, otherwise = 0 |
| Bit 12: | =1 when event has occurred in channel 1 in cycle bt3, otherwise = 0 |
| Bit 13: | =1 when event has occurred in channel 2 in cycle bt3, otherwise = 0 |
| Bit 14: | =1 when event has occurred in channel 1 in cycle bt4, otherwise = 0 |
| Bit 15: | =1 when event has occurred in channel 2 in cycle bt4, otherwise = 0 |

The storage of a word then takes place respectively L−1 sampling cycles after the first event has taken place in one of the input channels or after the counter has reached its overflow. With storage in 16-bit words, the following exemplary coding thus results, the low bytes giving the time elapsed since the storage and the high bytes giving the channel states:

Word (hex): Signal sequence:

| | |
|---|---|
| 197B | Low byte: 7B (hex) = 123 (decimal); high byte 19 (hex) = 00011001 (binary) An event was detected in channel 1 in sampling cycles 124 (bt1) and 126 (bt3), and an event was detected in channel 2 in sampling cycle 125 (bt2). |
| 00FF | Low byte: FF (hex) = 255 (dec); high byte 00 (hex) = 00000000 (binary). Data storage took place after counter overflow, i.e., no event occurred in any of the input channels in the following four sampling cycles 256–259 (bt1–bt4) after the counter had reached its maximum value of 255. |
| 18FF | Low byte: FF (hex) = 255 (dec); high byte 18 (hex) = 00011000 (binary). Data storage took place after counter overflow, i.e., an event occurred in sampling cycle 257 (bt2) in channel 1 and in sampling cycle 258 (bt3) in channel 2, after the counter had reached its maximum value of 255. |
| 117B | Low byte: 7B (hex) = 123 (decimal); high byte 11 (hex) = 00010001 (binary) An event was detected in channel 1 in sampling cycles 124 (bt1) and 126 (bt3), and no events were detected in channel 2. |

The codings given by way of example demonstrate that in the second embodiment, in the case that no event occurs in one of the channels up to counter overflow, the storage takes place of the first L sampling cycles after counter overflow, without the complete signal recording being lost. This is attained because the bits provided for the characterization of the channel states also contain information concerning the sampling cycle in which an event occurs.

The coded and stored words are deposited in a mass storage device (5) and can then be read out by means of a PCI interface (6) and processed in one step (7). Characteristic defects, or interference due to the bleaching of the colorants, which would lead to erroneous results in the subsequent evaluation, are eliminated by the data processing. Furthermore, a limit correlation time for the correlation algorithms to be used can be given by the data processing.

The subsequent calculation of the time correlation functions of the input channels takes place according to two different algorithms. For correlation times shorter than the selected boundary correlation time, a linear algorithm is used, which determines the correlation function from the histograms of the pulse time intervals of the recorded signal sequences.

In the case of autocorrelation, that is, of the evaluation of the channels separately, all possible pulse intervals are determined. This can proceed as follows: If tk is the time interval between the k-th pulse and the k+1-th pulse (for k=1, 2, . . . N), the histogram H(t) of the pulse time intervals then results from the definition:

$H(t)=0$ $H(t)=H++$, when $t==t1$ $H(t)=H++$, when $t==t1+t2$ $H(t)=H++$, when $t==t1+t2+t3+$ . . .

. . .

$H(t)=H++$, when $t==t2$ $H(t)=H++$, when $t==t2+t3$ $H(t)=H++$, when $t==t2+t3+$ . . .

. . .

$H(t)=H++$, when $t==tk$ $H(t)=H++$, when $t==tk+t(k+1)$ $H(t)=H++$, when $t==tk+t(k+1)+t(k+2)$ $H(t)=H++$, when $t==tk+t(k+1)+t(k+2)+$ . . .

For binary pulse sequences and under the precondition that no further pulses follow after a given pulse, and at most one pulse appears in each sampling cycle, the autocorrelation function A(t)=H(t) is equal to the histogram of the pulse intervals.

In the case of cross-correlation, two-pulse sequences n, m are correlated with each other. If ka is the number of the first pulse of the pulse sequence m, which follows the a-th pulse ia of the pulse sequence n, and if dja is the pulse time interval between the a-th pulse and the a+1-th pulse of the pulse sequence m, where i, j=1, 2, . . . N denote the time interval concerned, a histogram K for the time intervals between the pulses of the two pulse sequences n, m is defined analogously to the definition of a histogram for the pulse time intervals of a single pulse sequence:

$K(t)=0$ $K(t)=K++$, when $t==k1-i1$ $K(t)=K++$, when $t==k1-i1+djk1$ $K(t)=K++$, when $t==k1-i1+djk1+djk2$ $K(t)=K++$, when $t==k1-i1+djk1+djk2+$ . . .

. . .

$K(t)=K++$, when $t==k2-i2$ $K(t)=K++$, when $t==k2-i2+djk2$ $K(t)=K++$, when $t==k2-i2+djk2+djk3$ $K(t)=K++$, when $t==ka-ia+djka+djk(a+1)$ $K(t)=K++$, when $t==ka-ia+djka+djk(a+1)+$ . . .

It can be shown that for binary pulse sequences the cross-correlation of the two pulse sequences n, m corresponds to the above-defined histogram.

The described linear algorithm, in which the autocorrelation and the cross-correlation are determined by means of the histogram of the pulse intervals, and consequently require only a small computation cost for small correlation times, is applied only for correlation times below the given boundary value. For greater correlation times, the autocorrelation and/or the cross-correlation are carried out according to the multiple tau process in one step 8 in FIG. 1. Reference may be made, regarding the algorithms applied here, to the product information of the ALV-Laser Vertriebsgesellschaft m.b.H. of Langen, FRG; to the ALV-5000 Digital Multiple Tau Correlator; and in particular to the document "Introduction to the Multiple Tau Correlation Technique" by Rainer Peters. The results of both algorithms are subsequently combined in a step 10 to a composite diagram.

The process according to the invention has a preferred application to confocal microscopy, in which the light beam emitted by one or more lasers (11) is focused on a specimen (12) by a microscope objective (13) of high numerical aperture. The algorithms are subsequently combined in a step 10 to a composite diagram.

The process according to the invention has a preferred application to confocal microscopy, in which the light beam emitted by one or more lasers (11) is focused on a specimen (12) by a microscope objective (13) of high numerical aperture. The excitation volume in the specimen (12) is then only a few femtoliters. The fluorescence radiation excited in the specimen (12) is collected again by the objective (13), separated from the exciting light by means of a color divider (15), and subsequently conducted to two separate detection channels by means of a second color divider (14). A confocal diaphragm (16, 17) is provided in each of the two detection channels, both being arranged in a plane conjugate to the focal plane of the objective (13). After transmission through the confocal diaphragms, the light signal contained in each detection channel is detected by highly sensitive detectors which are designed for the detection of single photons. The confocal diaphragms then ensure that the volume in the specimen from which fluorescence radiation is detected has the small size of the excitation volume. Because of the very small excitation volume and detection volume, pulse signals appear in both detection channels and consist substantially of single pulses with long intervals between pulses. KEY TO FIG. 1:

|  | channel 1, channel 2, channel n |
| --- | --- |
| 2 | sampling/event unit |
| 4a | L x n -bit channel coding |
| 4b | count values |
| 5 | FIFO |
| 6 | PCI interface |
| 1 | clock oscillator |
| 3 | M-bit counter |
| 7 | data processing/select threshold |
| 8 | multiple tau algorithm |
| 9 | linear algorithm |
| 10 | autocorrelation, cross-correlation |

We claim:

1. A process for the recording of pulse signals of at least two input channels, the pulse signals of each of said input channels varying with time between two different states and the pulse signals of each of said input channels at each time having a present state, wherein a change of the state in one of the input channels is indicative of an event having occurred, the process comprising:

sampling said input channels with a predetermined sampling frequency of events, and after detection of an event in at least one of said input channels, or after overflow of a counter, storing the present states of all said input channels in a memory register together with a magnitude characterizing the time having lapsed since a last preceding storing operation.

2. The process according to claim 1, wherein the data of the input channels are binary.

3. The process according to claim 1, further comprising effecting a correlation evaluation on stored data.

4. The process according to claim 3, further comprising calculating a cross-correlation of the data of two input channels.

5. The process according to claim 3, further comprising selecting a correlation boundary and for correlation times which are smaller than said correlation boundary, calculating said correlation without loss, based on the histograms of the intervals between pulses.

6. A process for the recording of pulse signals of at least two input channels, the pulse signals of each of said input channels varying with time between two different states and the pulse signals of each of said input channels at each time having a present state, wherein a change of the state in one of the input channels is indicative of an event having occurred, the process comprising:

sampling said input channels with a predetermined sampling frequency over a number of sampling cycles for detecting events, and after detection of an event in at least one of the input channels, or after overflow of a counter, storing the states of all of said input channels for a number of sampling cycles, wherein said number of sampling cycles comprises the sampling cycle in which the event was detected or the counter has flown over and a predetermined number of consecutive sampling cycles, together with a magnitude characterizing the time having lapsed since the last preceding storing operation.

7. The process according to claim 6, wherein the storage takes place as words with at least 16 bits, and wherein the predetermined number of sampling cycles with two input channels is at least two, or three.

8. A device for recording pulse signals of at least two input channels according to a process a clock oscillator, a sampler that samples said input channels, a counter, and a memory, wherein the detection of a first event in one of said input channels or the overflow of said counter, according to which event occurs first, triggers an operation of storage of the states of all said input channels and of the last counter state at the occurrence of the event.

9. A confocal microscope comprising at least two confocal detector channels for the separate detection of light at two different wavelengths, and a device for recording pulse signals according to claim 8.

* * * * *